No. 866,980. PATENTED SEPT. 24, 1907.
A. B. TAYLOR.
CHAIN.
APPLICATION FILED JUNE 28, 1905.
2 SHEETS—SHEET 1.
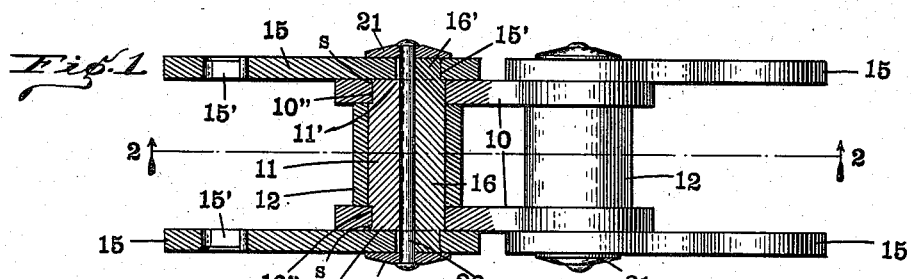
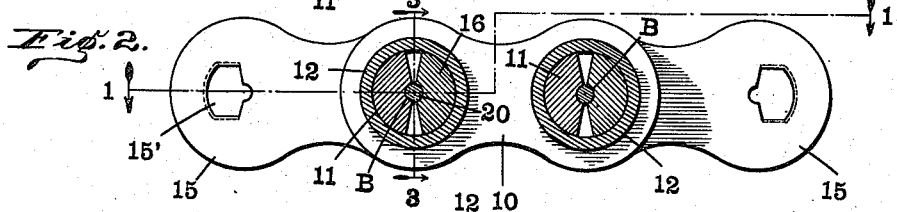
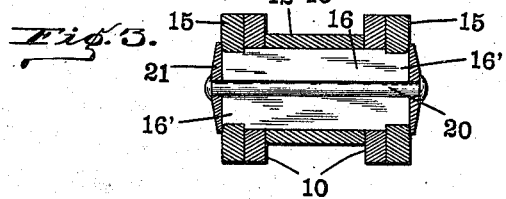
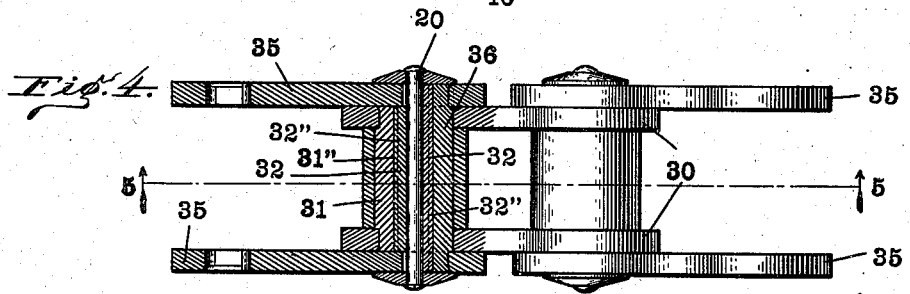
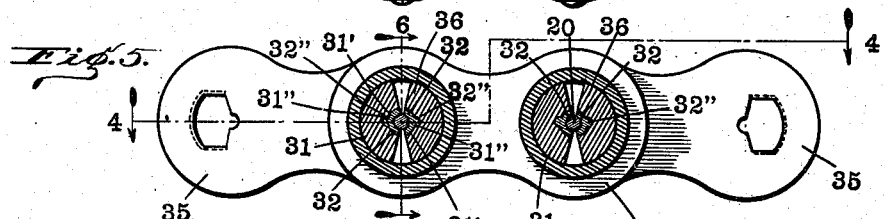
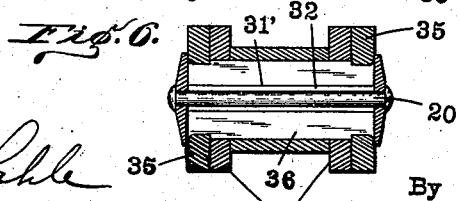
Witnesses
Frank A. Fahle
J. A. Walsh
Inventor
Arthur B. Taylor
By Bradford & Hood
Attorneys No. 866,980. PATENTED SEPT. 24, 1907.
A. B. TAYLOR.
CHAIN.
APPLICATION FILED JUNE 28, 1905.
2 SHEETS—SHEET 2.
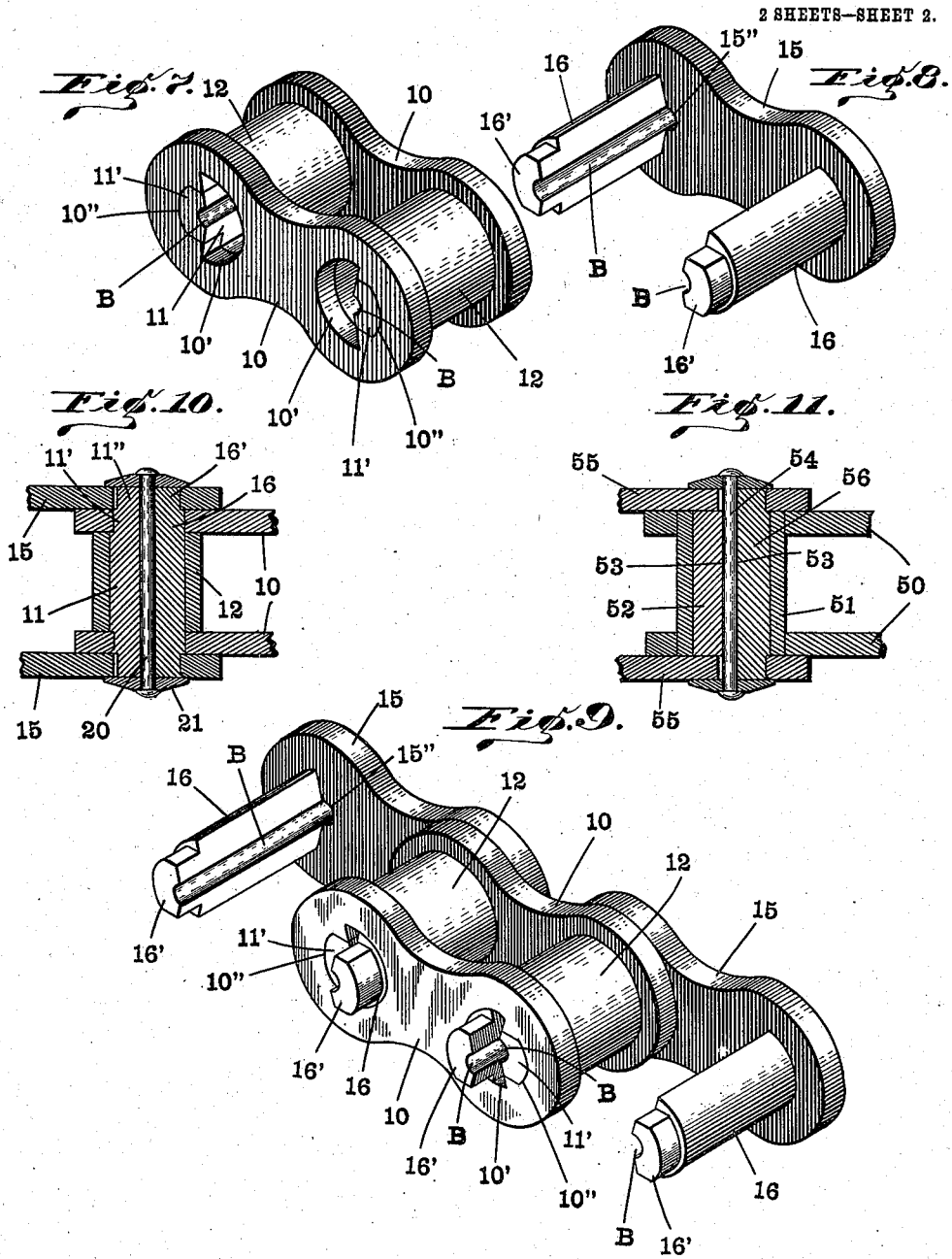

UNITED STATES PATENT OFFICE.

ARTHUR B. TAYLOR, OF INDIANAPOLIS, INDIANA.

CHAIN.

No. 866,980.     Specification of Letters Patent.     Patented Sept. 24, 1907.

Application filed June 28, 1905. Serial No. 267,379.

*To all whom it may concern:*

Be it known that I, ARTHUR B. TAYLOR, a citizen of the United States, residing at Indianapolis, in the county of Marion and State of Indiana, have invented certain new and useful Improvements in Chains, of which the following is a specification.

In the operation of chains used for driving machinery difficulty is experienced by reason of the fact that, as the chain wears, its pitch increases and in course of time the chain no longer fits the sprocket wheel for which it is designed.

The object of my present invention is to produce a pitch chain in which the wear which may affect the pitch may be reduced to a minimum and in which the worn part may be readily replaced to bring the parts to initial pitch without dismantling the chain.

The accompanying drawings illustrate my invention:

Figure 1 is a section on line 1 1 of Fig 2 and illustrates a chain embodying one form of my invention; Fig. 2 a section on line 2 2 of Fig. 1; Fig. 3 a section on line 3 3 of Fig. 2. Fig. 4 a view similar to Fig. 1 showing another form of my invention said view being a section on line 4 4 of Fig. 5; Fig. 5 a section on line 5 5 of Fig. 4; Fig. 6 a section on line 6 6 of Fig. 5; Fig. 7 an isometric perspective view of the intermediate link shown in Fig. 1; Fig. 8 a similar view of a portion of one of the end links shown in Fig. 1 with both cross bars in position; Fig. 9 a similar view showing the manner of assembling the various parts of the chain, and Figs. 10 and 11 sectional views of modifications.

In Figs. 1, 2, 3, 7, 8 and 9, of the drawings, 10 10 indicate a pair of side bars each of which is perforated at each end with a perforation 10′ the larger portion of which has an angular dimension somewhat greater than 180 degrees. This perforation 10′ is supplemented, on the side next its center of curvature, by a somewhat smaller perforation 10″, said perforation 10″ being adapted to receive the ensmalled end 11′ of a cross bar 11, said ensmalled end being a trifle longer than the thickness of the side bars 10 so that, by compression, the outer end of the portion 11′ may be swaged over into the slightly enlarged outer end of the perforation 10″, as indicated at *s* in Fig. 1. Each cross bar 11 is provided with an axial, nearly semicylindrical bore B for a purpose which will appear.

In order to assemble the chain, two cross bars 11 are secured to a side bar 10 by swaging the outer ends of the ensmalled portions 11′ into the perforations 10″, and a roller 12 is then slipped over each cross bar, the exterior of each cross bar being substantially semicylindrical and the length of each of the rollers being substantially the distance between the shoulders formed by the ensmalled ends 11′ at each end of the cross bar 11. The other side bar 10 is then slipped over the opposite ensmalled ends 11′ of the cross bars 11 and secured in position by swaging down said ends 11′, thus producing the structure shown in Fig. 7. This completed link (hereinafter called the inner link) being in a form which needs no disassemblement in the future.

To complete the chain a side bar 15 is first provided with a pair of cross bars 16 each of said cross bars having at each end an ensmalled end 16′ which is adapted to be inserted at a perforation 15′ formed at each end, the end 16′ being swaged down into the perforation in the manner already described. The perforation 15′ is supplemented at its axis by a semicylindrical perforation 15″ which is slightly larger than the diameter of the bore B of the cross bar 11 and the similar bore B of cross bar 16. When the parts have been thus assembled, as shown in Fig. 8, a cross bar 16 is projected through the alined perforations 10′ at one end of the completed inner link, as shown in Fig. 9. Another link similar to that shown in Fig. 7 is then slipped over each of the end cross bars 16, and a second side bar 15 then slipped over the ensmalled ends 16′ of each pair of said cross bars 16 and said ends are swaged down to hold the parts in permanent position. A cross pin or compression member 20 is then slipped through each bore B and the ends slightly headed to prevent transverse displacement, a washer 21 being slipped under each head if desired. By this construction it will be noticed that each cross bar is rigidly attached to its pair of side bars and swings therewith so that there is no frictional wear between the said side bars and the cross bars, but that the entire wear comes between the cross bars and the cross pin. As a consequence, the wear may be readily compensated by removing of the worn cross pins and slipping in new pins of the same size as the original or, if necessary, a few thousandths larger.

The cross bars 11 and 16 may be hardened if desired or a construction such as that shown in Figs. 4, 5, and 6 provided where hardened wearing surfaces are deemed necessary. In these figures the intermediate links are composed of side bars 30 and cross bars 31, each cross bar having an axial groove 31″, the construction being such as to receive a substantially semiannular bushing 32 which is similarly provided with a peripheral longitudinal rib 32″ adapted to fit in the groove 31″. The connecting outside links are similarly formed from side bars 35 and cross bars 36, each of which is provided with a bore 31′—31″ adapted to receive one of the bushings 32—32″. The same cross pin 20 is to be inserted between the two bushings 32.

The strength of a chain such as that shown in Fig. 1 will probably be dependent upon the combined shearing strength of the ensmalled ends 16′ and pin 20, and to produce a stronger chain with the same size parts the construction shown in Fig. 10 may be adopted. Here the parts 10, 16—16′, 12 and 20 are the same as shown in Fig. 1. The cross pins 11, however, have their ends provided with ensmalled extensions 11″ which project through the side bars 15 and in order to permit this the side bars are suitably perforated as shown in Fig. 10, the ensmalled extensions 11'' serving to support the portions of pin 20 which project beyond bar 10, and thus serving to strengthen, through pin 20, the ensmalled portions 16' of bar 16.

In Fig. 11 I show a modification in which the two side bars 50 of the inner link are connected at each end by a tubular bushing 51 and mounted within each of these bushings is a cross bar 52 which is nearly semicylindrical and provided with an axial groove 53 for the reception of the cross-pin 54. The cross bar 52 fits snugly within the bushing and is of a length substantially equal to the length of the bushing. The side links 55 are connected at each end by a nearly semicylindrical cross bar 56 which also has an axial groove 53 adapted to receive the pin 54. The cross bar 56, however, is shouldered at each end and rigidly attached to the side bars 55 either by way of riveting as shown, or any other means. In this form, under ordinary circumstances, any flexing of the chain will be accomplished by a rocking movement of the two cross bars on the cross pin, but if, for any reason, a greater amount of movement should be necessary, the bushing 51 may swing on the cross bar 52 but such movement would not ordinarily take place.

It will be noticed that in all of the forms shown the final structure is one which contains all of the advantages of a riveted pitch chain, that is, that the side bars of the outer link are permanently connected by means which will not permit transverse displacement or disassemblement and will not permit swinging of the side bars on the cross bars, yet the construction is such that by mere removal of the cross pin and substitution of new ones all wear may be readily compensated and the chain easily brought back to its initial and proper length. The cross pins do not serve to hold any parts of the chain in transverse placement.

It is to be understood that, while I have described a preferable structure, in which the side bars of the inner links are riveted to the cross bars, the side bars of the inner links may be merely slipped over the ends of their cross bars or pressed thereon, without departing from my invention.

I claim as my invention:

1. A chain composed of a plurality of successive pairs of links, the inner link of a pair comprising two cross bars and an intermediate connecting member, and the outer link of a pair comprising two cross bars each passing through an inner link between the two cross bars thereof, and also comprising a pair of side bars which connect and are permanently secured to the cross bars of said outer link, the adjacent faces of each pair of cross bars being formed to coöperate with a transversely-removable intermediate compression member, and the said transversely removable compression member for each pair of cross bars, said transversely removable compression member being at all times accessible at one end without dismembering the links.

2. A chain composed of a plurality of successive pairs of links, the inner link of a pair comprising two cross bars and an intermediate connecting member, and the outer link of a pair comprising two cross bars each passing through an inner link between the two cross bars thereof, and also comprising a pair of side bars which connect and are permanently secured to the cross bars of said outer link, the adjacent faces of each pair of cross bars being formed to coöperate with a transversely-removable intermediate compression member, said transversely removable compression member for each pair of cross bars the said compression member for each pair of cross bars, and a tubular roller journaled on each pair of cross bars, said transversely removable compression member being at all times accessible at one end without dismembering the links.

3. A chain composed of a plurality of successive pairs of links, the inner link of a pair comprising two side bars and two cross bars permanently connected together, and the outer link of a pair comprising two side bars and two cross bars also permanently connected together, the cross bars of the outer link each passing through the side bars of an inner link between the cross bars thereof, the adjacent faces of each pair of cross bars being formed to coöperate with a transversely - removable intermediate compression member, said transversely removable compression member for each pair of cross bars and the said compression member for each pair of cross bars, said transversely removable compression member being at all times accessible at one end without dismembering the links.

4. A chain composed of a plurality of successive pairs of links, the inner link of a pair comprising two side bars and two cross bars permanently connected together, and the outer link of a pair comprising two side bars and two cross bars also permanently connected together, the cross bars of the outer link each passing through the side bars of an inner link between the cross bars thereof, the adjacent faces of each pair of cross bars being grooved to receive a bushing member each of which is formed to coöperate with an intermediate transversely-removable compression member, such bushing members and the said compression member for each pair of cross bars, said transversely removable compression member being at all times accessible at one end without dismembering the links.

5. A chain composed of a plurality of successive pairs of links, the inner link of a pair comprising two side bars and two cross bars permanently connected together, and the outer link of a pair comprising two side bars and two cross bars also permanently connected together, the cross bars of the outer link each passing through the side bars of an inner link between the cross bars thereof, the adjacent faces of each pair of cross bars being formed to coöperate with a transversely-removable intermediate compression member, the said compression member for each pair of cross bars, and a tubular roller journaled on each pair of cross bars, said transversely removable compression member being at all times accessible at one end without dismembering the links.

6. A chain composed of a plurality of successive pairs of links, the inner link of a pair comprising two side bars and two cross bars permanently connected together, and the outer link of a pair comprising two side bars and two cross bars also permanently connected together, the cross bars of the outer link each passing through the side bars of an inner link between the cross bars thereof, the adjacent faces of each pair of cross bars being grooved to receive a bushing member each of which is formed to coöperate with an intermediate transversely-removable compression member, such bushing members, the said compression member for each pair of cross bars, and a tubular roller journaled on each pair of cross bars, said transversely removable compression member being at all times accessible at one end without dismembering the links.

7. A chain composed of a plurality of successive pairs of links, the inner link of a pair comprising two cross bars and an intermediate connecting member, and the outer link of a pair comprising two cross bars having shouldered ends and each passing through an inner link between the two cross bars thereof, and also comprising a pair of side bars riveted to the shouldered ends of their cross bars, the adjacent faces of each pair of cross bars being formed to coöperate with a transversely-removable intermediate compression member, and said compression member for each pair of cross bars, said transversely removable compression member being at all times accessible at one end without dismembering the links.

8. A chain composed of a plurality of successive pairs of links, the inner link of a pair comprising two cross bars and an intermediate connecting member, and the outer link of a pair comprising two cross bars having shouldered ends and each passing through an inner link between the two cross bars thereof, and also comprising a pair of side bars riveted to the shouldered ends of their cross bars, the adjacent faces of each pair of cross bars being formed to coöperate with a transversely-removable intermediate compression member, said compression member for each pair of cross bars, and a tubular roller journaled on each pair of cross bars, said transversely removable compression member being at all times accessible at one end without dismembering the links.

9. A chain comprising the following elements: two links each comprising two perforated side bars and two shouldered cross bars riveted to their side bars and two other intermediate links each comprising two perforated side bars and two shouldered cross bars riveted thereto, the cross bars of the last mentioned links passing through the side bars of the first mentioned links between the cross bars thereof and the adjacent faces of each pair of cross bars being formed to coöperate with an intermediate transversely-removable compression member, and such compression member for each pair of cross bars, said transversely removable compression member being at all times accessible at one end without dismembering the links.

10. A chain comprising the following elements: two links each comprising two perforated side bars and two shouldered cross bars riveted to their side bars, and two other intermediate links each comprising two perforated side bars and two shouldered cross bars riveted thereto, the cross bars of the last mentioned links passing through the side bars of the first mentioned links between the cross bars thereof and the adjacent faces of each pair of cross bars being formed to coöperate with an intermediate transversely removable compression member, such compression member for each pair of cross bars, and a tubular roller journaled on each pair of cross bars between the side bars of the first mentioned links, said transversely removable compression member being at all times accessible at one end without dismembering the links.

In witness whereof, I, have hereunto set my hand and seal at Indianapolis, Indiana, this 23d day of June, A. D. one thousand nine hundred and five.

ARTHUR B. TAYLOR. [L. S.]

Witnesses:
 ARTHUR M. HOOD,
 JAMES A. WALSH.